United States Patent [19]

Jones, Jr.

[11] 4,439,350

[45] Mar. 27, 1984

[54] CONTACT STRUCTURE FOR USE IN CATALYTIC DISTILLATION

[75] Inventor: Edward M. Jones, Jr., Friendswood, Tex.

[73] Assignee: Chemical Research & Licensing Company, Houston, Tex.

[21] Appl. No.: 390,395

[22] Filed: Jun. 21, 1982

[51] Int. Cl.$^3$ .............................................. B01J 35/04
[52] U.S. Cl. .............................. 502/527; 203/DIG. 6
[58] Field of Search .............. 252/477 R; 203/DIG. 6

[56] References Cited

U.S. PATENT DOCUMENTS

| | | | |
|---|---|---|---|
| 4,215,011 | 7/1980 | Smith | 252/426 |
| 4,232,177 | 11/1980 | Smith | 585/324 |
| 4,280,926 | 7/1981 | Abe et al. | 252/477 R |
| 4,302,356 | 11/1981 | Smith | 252/426 |

Primary Examiner—W. J. Shine
Attorney, Agent, or Firm—Kenneth H. Johnson

[57] ABSTRACT

A method for conducting catalytic chemical reactions and fractionation of the reaction mixture comprising feeding reactants into a distillation column reactor contracting said reactant in liquid phase with a fixed bed catalyst in the form of a contact catalyst structure consisting of closed porous containers containing the catatlyst for the reaction and a clip means to hold and support said containers, which are disposed above, i.e., on the distillation trays in the tower. The trays have weir means to provide a liquid level on the trays to substantially cover the containers. In other words, the trays function in their ordinary manner with the addition thereto of the catalyst. The reaction mixture is concurrently fractionated in the column.

9 Claims, 7 Drawing Figures

4,439,350

CONTACT STRUCTURE FOR USE IN CATALYTIC DISTILLATION

The Government of the United States of America has certain rights in this invention pursuant to Contract No. DE-FC07-80CS40454 awarded by the U.S. Department of Energy.

BACKGROUND OF THE INVENTION

1. Field of the Invention

The present invention relates to a contact structure to be used in catalytic reactions wherein the reaction and distillation of the reaction system are carried on concurrently in the same column.

2. Related Art

Recently a new method of carrying out catalytic reactions, wherein the components of the reaction system are separable by distillation has been developed, wherein the reaction and distillation are carried out concurrently, using the catalyst structures as the distillation structures. Such systems are described variously in U.S. Pat. Nos. 4,215,011; 4,232,177; 4,242,530; 4,250,052; 4,302,356; and 4,307,254 commonly assigned herewith. Briefly, a structure described there is a cloth belt with a plurality of pockets spaced along the belt, which is then wound in a helical about a spacing material such as stainless steel demister wire. These units are then disposed in the distillation column reactor.

In addition, U.S. patent application, Ser. No. 307,120 filed Sept. 30, 1981, discloses a variety of catalyst structures for this use.

Also, the previously noted patents suggest other configurations such as cages of wire cloth to contain catalyst beads, immersed in liquid on a conventional sieve tray. This arrangement is disclosed to have the disadvantage of the restriction of vapor flow by the close weave of the wire, which may be compensated by allowing the beads to move freely in the cage, thereby causing attrition.

U.S. Pat. Nos. 3,629,478 and 3,643,543 to Haunschild disclose a reaction carried out in distillation column wherein catalyst is contained in the downcomers or external of the column, such that the catalytic reaction takes place in the catalyst sections and the distillation takes place on the trays in the column. The problem which arises is that the catalyst in the downcomers causes them to be in a flooded condition.

U.S. Pat. No. 2,403,672 discloses a process for catalytic isomerization wherein the upper two thirds of a distillation column is packed with a catalytic material in the column to fractionate the product.

The present invention provides an alternative means to carry out a catalytic distillation wherein the catalyst is not the fractionation structure, but which does not have the disadvantages of described above for alternative methods. The present invention further provides a means or system wherein the catalyst contact structure is present in the reactor distillation column and does not impede the flow of vapor or cause flooding.

SUMMARY OF THE INVENTION

Briefly, the present contact catalyst structure comprises a plurality of porous closed containers, containing therein solid particulate catalyst and clip means for holding and spacing said containers as a unit for disposition above a distillation tray of a distillation column and the process of conducting a catalyst reaction therewith.

Generally the solid particulate catalyst is contained in perforated or porous metal or plastic containers, such as a fine screen or similar material. The containers are supported above a conventional distillation tray so as to permit liquid flow through and past the containers, and also to permit vapor passage through the liquid. A sufficient level is maintained on the tray to essentially completely submerge the containers. In this way, the reactive liquid phase is contacted with both the solid catalyst and vapor.

The process of the present invention is a method for concurrently conducting catalytic chemical reactions wherein the materials of the reaction mixture are separated by distillation and said materials are liquid or gaseous under the conditions of reaction: and fractionation of the reaction mixture comprising:

(a) feeding reactants to a distillation column reactor having a plurality of distillation trays therein, (b) concurrently:

(1) contacting said reactants in liquid phase with a fixed bed catalyst consisting of a plurality of closed porous containers, containing therein particulate catalyst for said reaction, said containers being arranged as a unit and spaced apart, said unit of containers being disposed above a portion of said distillation trays of said distillation column reactor, whereby liquid on said tray covers said containers, (2) fractioning the resulting reaction mixture in said distillation column reactor to recover a lower boiling fraction of said reaction mixture overhead and a higher boiling fraction thereof as a bottom, whereby said reaction and fractionation are occurring concurrently within said reactor, said reaction occurring in liquid phase and said reaction mixture being fractionated on said distillation trays.

DETAILED DESCRIPTION OF THE INVENTION AND PREFERRED EMBODIMENTS

Figure 1:
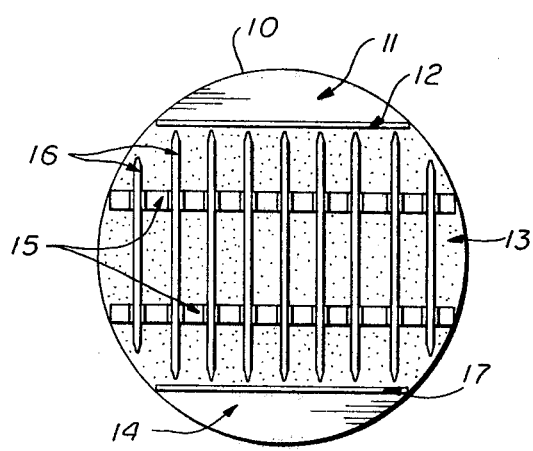
FIG. 1 is an in-plan view of a contact catalyst structure according to the present invention positioned above a perforated sieve tray.

A particular catalyst system of this type consists of a metal screen formed into a tube of rectangular cross section, filled with particulate solid catalyst and closed at the ends. Several such tubes may be supported on a distillation tray in a parallel array so that the liquid flow across the tray is either parallel to the tubes, or at right angles to them. If the flow is parallel, liquid flow is relatively unimpeded; if the flow is across the tubes, liquid is required to flow through the tubes from one side to the other. In the latter case, a sloping or staggered cascade tray is required to provide a gradient for flow. In either case, sieve-tray perforations, vapor valves, or other openings are located in the tray deck between the tubes, so that the vapor flow is not restricted by the presence of the tubes of solid particulate material.

The catalytic material may be any material appropriate for the reaction at hand, that is, it may be an acid catalyst or a basic catalyst or others such as catalytic metals and their oxides or halides suitable for a multitude of catalytic reactions and of course, heterogeneous with the reaction or fluids in the system. For example, one reaction is the preparation of formic acid from methanol using iron oxide.

The term "Catalyst" or "catalytic material" is used to include any solid particulate material which is recognized for the reaction under consideration as performing as a catalyst therein. In general, the particle size of the catalytic material is from about 1 mm down through powders, as appropriate for the mesh of the container. Generally, the container will be made of a material having some rigidity such as wire mesh (screen wire) or plastic mesh, although less rigid materials such as cloth may be used. The cloth may be cotton, fiber glass, polyester, nylon and the like. The screen wire may be aluminum, steel, stainless steel and the like. The plastic mesh may be nylon, Teflon or the like. The mesh of the container is smaller than the catalyst particles contained therein.

Generally, the wire mesh or plastic mesh are preferred because the rigid containers are more easily attached in the desired spaced array and the more open mesh of these materials allows greater flow of liquids into and through the containers. The mesh or threads per inch of the material used to make the container is such that the catalyst is retained therein and will not pass through the openings in the material. Although the catalyst particles are generally in the range of 0.25 to 1 mm, particles of about 0.15 mm size (diameter) or powders may be used and particles up to about ¼ inch diameter may be employed in the containers. The particulate catalytic material may be a powder; however, it is preferably small irregular fragments or chunks, small beads or the like.

The container has a generally elongated configuration, such as tubes, rectangular pockets and the like.

The containers are arranged in a substantially parallel configuration with spaces between the containers. This is conveniently obtained by means of clips which may be attached to the distillation tray or attached to a member which may be disposed on or attached to the distillation tray. Some specific catalysts and reactions are:

| Catalyst | Reaction |
|---|---|
| Acid cation exchange resins | dimerization, polymerization etherification, esterification, isomerization, alkylation |
| Magnesia, chomia, brucite | isomerization |
| Molecular sieves (synthetic allumino-silicates) | dimerization, polymerization, alkylation, isomerization, selective hydrogenation, dehydrogenation |
| Cobalt thoria | Fisher-Tropsch process |
| Aluminum chloride | Friedel-Crafts reaction |

| -continued | |
|---|---|
| Catalyst | Reaction |
| Cobalt molybdate | hydrofining |

The present contact catalyst structure is particularly suitable for use with the cation exchange resins. Such resins include cation exchangers, which contain sulfonic acid groups, and which have been obtained by polymerization or copolymerization of aromatic vinyl compounds followed by sulfonation. Examples of aromatic vinyl compounds suitable for preparing polymers or copolymers are: styrene, vinyl toluene, vinyl naphthalene, vinyl ethylbenzene, methyl styrene, vinyl chlorobenzene and vinyl xlyene. A large variety of methods may be used for preparing these polymers; for example, polymerization alone or in admixture with other monovinyl compounds, or by crosslinking with polyvinyl compounds; for example, with divinyl benzene, divinyl toluene, divinylphenylether and others. The polymers may be prepared in the presence or absence of solvents or dispersing agents, and various polymerization initiators may be used, e.g., inorganic or organic peroxides, persulfates, etc.

The sulfonic acid group may be introduced into these vinyl aromatic polymers by various known methods; for example, by sulfating the polymers with concentrated sulfuric acid or chlorosulfonic acid, or by copolymerizing aromatic compounds which contain sulfonic acid groups (see e.g., U.S. Pat. No. 2,366,007). Further sulfonic acid groups may be introduced into polymers which already contain sulfonic acid groups; for example, by treatment with fuming sulfuric acid, i.e., sulfuric acid which contains sulfur trioxide. The treatment with fuming sulfuric acid is preferable carried out at 0° to 150° C. and the sulfuric acid should contain sufficient sulfur trioxide so that it still contains 10 to 50% free sulfur trioxide after the reaction. The resulting products preferably contain an average of 1.3 to 1.8 sulfonic acid groups per aromatic nucleus. Particularly, suitable polymers which contain sulfonic acid groups are copolymers of aromatic nonovinyl compounds with aromatic polyvinyl compounds, particularly, divinyl compounds, in which the polyvinyl benzene content is preferably 1 to 20% by weight of the copolymer (see, for example, German Patent Specification No. 908,247).

The ion exchange resin is preferably used in a granular size of about 0.25 to 1 mm, although particles from 0.15 mm up to about 11 mm may be employed. The finer catalysts provide high surface area, but also result in high pressure drops through the reactor. The macroreticular form of these catalysts is preferred because of the much larger surface area exposed and the limited swelling which all of these resins undergo in a non-aqueous hydrocarbon medium.

Similarly, other acid resins are suitable, such as perfluorosulfonic acid resins which are copolymers of sulfonyl fluorovinyl ethyl and fluorocarbon and described in greater detail in DuPont "Innovation" Volume 4, No. 3, Spring 1973 or the modified forms thereof as described in U.S. Pat. Nos. 3,784,399; 3,770,567 and 3,849,243.

In a specific process, the contact catalyst structures of the present invention are disposed in a distillation column reactor and a concurrent etherification and fractionation carried out therein.

Referring to the drawings, FIG. 1 shows in-plan a perforated sieve tray 13 positioned horizontally in a distillation column reactor 10 having a downcomer 11 and inlet seal pan 14. A plurality of catalyst containers containing catalyst, (not shown) are mounted in support clips 15, said clips being positioned adjacent to downcomer 11, and although not shown in this figure the weir is of height slightly exceeding the height of the arrayed catalyst containers, such that the operation of the column to obtain overflow of liquid in the column, results in the catalyst containers being covered by liquid. The inlet seal pan 14 is provided to allow the downcomer (if any) from the next higher tray (not shown) in the column to feed onto the tray at a point separated from the catalyst containers and seive portion of the tray. The incoming liquid overflows weir 17 into the area of the tray containing the catalyst containers.

Figure 2:
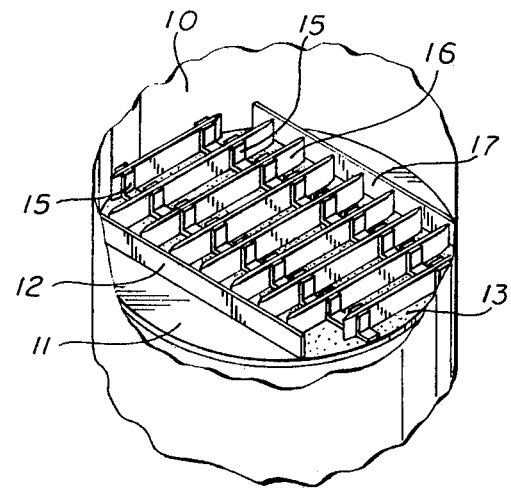
FIG. 2 shows a perspective view of a cut-away distillation column reactor having a perforated sieve tray with a contact catalyst structure positioned thereon.
Figure 6:
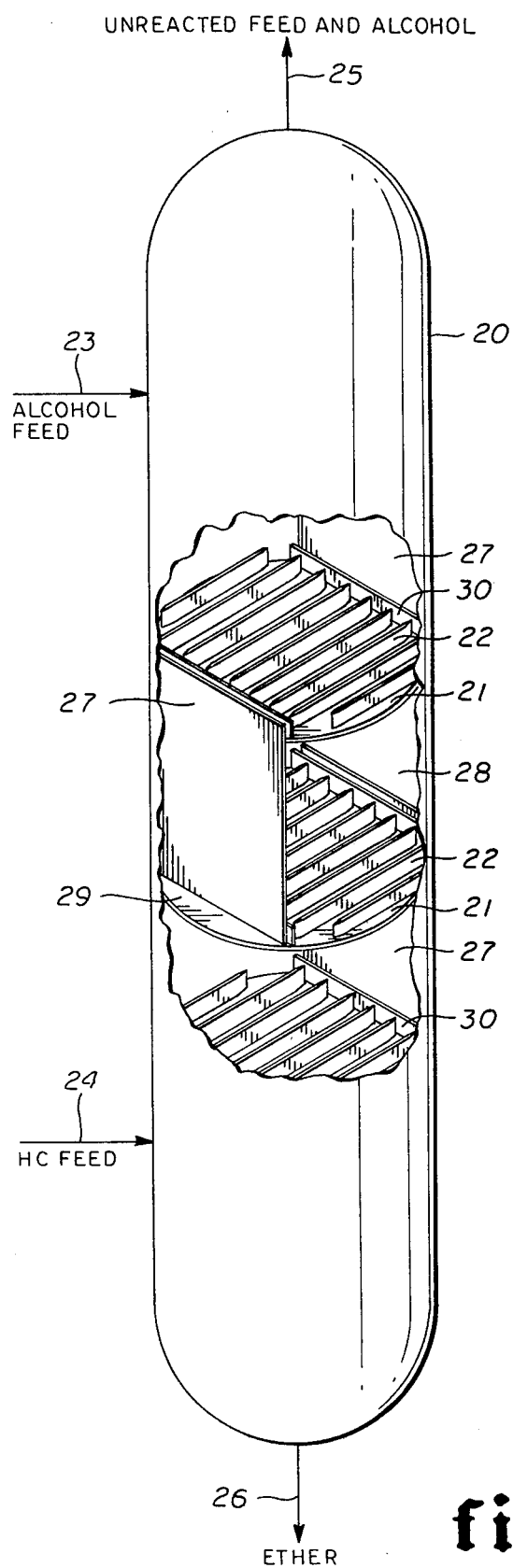
FIG. 6 is a partial cutaway view of a distillation column reactor with contact catalyst structures of the present invention positioned therein in perspective.

FIG. 2 is a perspective view of a perforated sieve tray 13 and contact catalyst structure (support clips 15 and catalyst containers 16) as shown in FIG. 1, mounted substantially horizontally in column 10. Referring to FIG. 6 a column 20 is shown in schematic elevation with a vertical series of substantially horizontal distillation trays 21 having contact catalyst structure 22 seated above or on each tray. In this embodiment, the catalyst structures are shown positioned in substantially parallel array on subsequent trays, thereby reducing the likelihood of channeling in the column.

The catalyst structures are preferably arranged or arrayed in the same alignment, such that the containers are lying in substantially parallel planes and directions. Other means not shown can be disbursed between the trays to improve distribution and inhibit channeling.

Figure 3:
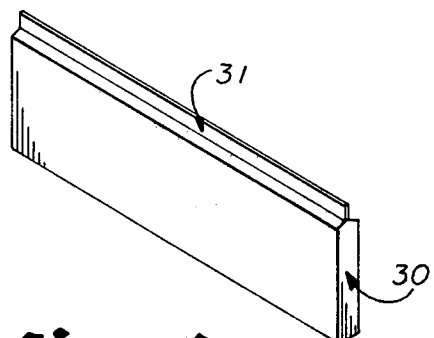
FIG. 3 is a perspective view of one embodiment of a catalyst container.
Figure 4:
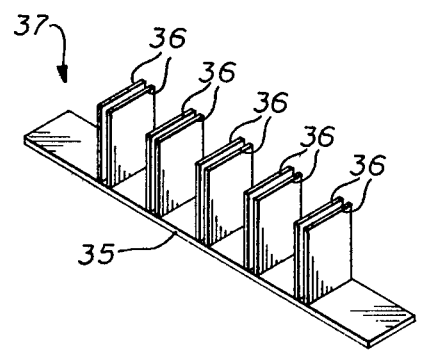
FIG. 4 is a perspective view of one embodiment of a container clip support.

FIG. 3 shows a catalyst container 30 consisting of rigid material such as 100 mesh stainless steel wire having a closure 31. The containers is filled with a catalytic material (not shown). FIG. 4 illustrates one means for positioning the containers in fixed array in the trays. The clip structure 37 is a clip support and consists of a base 35 with pairs of rigid or resilient material 36, such as spring stainless steel extending substantially perpendicuar therefrom. The base 35 is suitably stainless steel also with the upright member 36 being welded thereto. Each pair is spaced apart a distance to grasp the container by the spring action of the pair members. Usually two or more (depending on the diameter of the column and the length of the containers) of the clip structures 37 are used on a tray to hold the containers. Moreover, in a large diameter columns several catalyst structures may be placed on the tray in parallel array forming an arrangement of the same type as shown in FIGS. 1, 2, and 6, for example.

Figure 7:
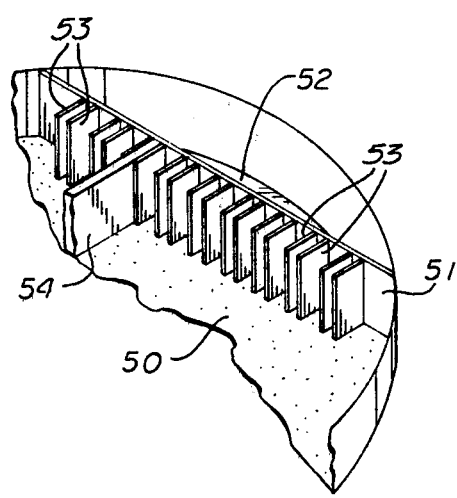
FIG. 7 is a partial perspective view of a distillation tray showing clips attached to an overflow weir for holding containers on the tray.

FIG. 7 shows distillation tray 50 having weir 51 adjacent downcomer 52. Mounted along weir 51 and extending substantially perpendicularly thereto are pairs of rigid or resilient material (e.g. stainless steel) 53 with each spaced apart to grasp a container 54. This means of supporting the containers may be used in place of the clips as shown in FIGS. 1, 2, 4, or 5 or in combination with the clips.

FIGS. 1, 2 and 6 show a positioning of catalyst structures, 13, substantially horizontally such that the flow of liquids relative to the containers is substantially parallel.

Figure 5:
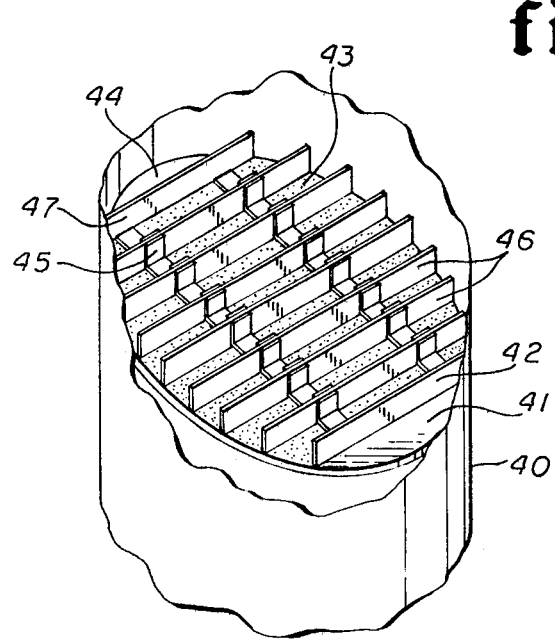
FIG. 5 shows a perspective view of a distillation column reactor having a sloping perforated sieve tray with a contact catalyst structure positioned thereon.

FIG. 5 discloses a positioning of the catalyst structure such that the flow of liquids is at right angles to catalyst containers 46, and thus through the containers. In this configuration the distillation tray 43 is mounted on a slope in the distillation column reactor 40 such that the liquid falling from an upper downcomer (not shown) on to inlet seal pan 44 over weir 47 and through the containers 46 which are supported on the tray 43 by support clips 45 and over overflow weir 42 into downcomer 41. The tray may be also constructed in a cascade arrangement of multiple levels, so that the liquid is induced to flow through the catalyst containers.

The operation of this system may also be described as a "catalytic distillation" even though the catalyst structure does not serve as the distillation structure. The effect is similar in that the advantages arising from the concurrent reaction and distillation are present. The success of catalytic distillation lies in an understanding of the principles associated with distillation. For example, in the process of producing methyl tertiary butyl ether using methanol and a $C_4$ hydrocarbon stream containing isobutene (also n-butene, butane and small amounts of butadiene, $C_3$'s and $C_5$) this process is highly advantageous. First, because the reaction is occurring concurrently with distillation, the initial reaction product, e.g., methyl tertiary butyl ether is removed from the reaction zone as quickly as it is formed. This removal of the ether minimized decomposition of the ether and chaining to form isobutene polymer. Second, because all the $C_4$ components are boiling, the temperature of the reaction is controlled by the boiling point of the $C_4$ mixture at the system pressure. The heat of reaction simply creates more boil up, but no increase in temperature. Third, the reaction has an increased driving force because the reaction products have been removed and can not contribute to a reverse reaction (LeChatelier's Principle).

As a result, a great deal of control over the rate of reaction and distribution of products can be achieved by regulating the system pressure. Also, adjusting the through-put (residence time=liquid hourly space velocity-1) gives further control of product distribution and degree of isobutene or isoamylene conversion.

The temperature in the reactor is determined by the boiling point of the liquid mixture present at any given pressure, or in the case of any mixture of $C_4$'s and $C_5$'s with alcohol, the boiling point of the unreacted hydrocarbons. The temperature in the lower portions of the column will reflect the constitution of the material in that part of the column, which will be higher than the overhead; that is, at constant pressure a change in the temperature of the system indicates a change in the composition in the column. To change the temperature the pressure is changed. Temperature control in the reaction zone is thus controlled by the pressure; by increasing the pressure, the temperature in the system is increased, and vice versa.

The reaction of olefins, e.g., isobutene with alcohol, e.g., methanol is equilibrium limited; however, by carrying out the reaction in a distillation column reactor and fractionating the formed product, e.g., methyl tertiary butyl ether (MTBE), downward away from the reaction zone, the equilibrium is constantly disrupted and hence the reaction never comes to equilibrium. This has the advantage, of course, of potentially achieving an effective 100% conversion, provided the catalyst bed is of sufficient length such that none of the olefin, e.g., isobutene escapes therefrom to go overhead with the unreacted material, n-butenes. The adjustment of the size of the catalyst bed is an economic consideration to be determined for each reactor and in accordance with the reaction conditions.

The present system has a further advantage, which is the liquid phase contact of the reactives with the catalyst. In the catalytic distillation where the catalyst structure serves as the distillation structure, there is, as in any distillation both a vapor phase (overhead) and a liquid phase (condensate). The reactive phase would appear to be the liquid phase, since catalytic contact is greater, also the prior art has generally used bulk liquid phase reactions for etherification, which would tend to support that view. As a general rule it can be appreciated that catalytic reactions with heterogeneous catalysts are preferably carried out in liquid phase because of the greater contact (i.e., higher molecular concentration of liquid compared to gaseous material per unit volume) with the catalysts.

Thus, the present contact catalyst structure provides the advantages of both liquid phase catalyst contact and concurrent distillation.

Referring again to FIG. 6 the operation of the present contact catalyst structure is further described in regard to the etherification. Methanol is fed via line 23. The $C_4$ stream enters through line 24. The trays 21 containing the catalyst structure 22 comprise the catalyst bed. The column may contain additional trays (not shown) without catalyst to further facilitate the separation of the components of the reaction system. Moverover, the process may be carried out according to commonly assigned U.S. patent application, Ser. No. 349,043, filed Feb. 16, 1982, which is incorporated herein. Briefly, that application discloses the use of two zones for the reactor wherein a lower catalytic distillation zone is operated at higher pressure and an upper non catalytic distillation zone is operated at lower pressure to reduce methanol in the overhead.

The methanol and isobutene containing $C_4$ stream are contacted in the catalyst bed on the trays 21 in liquid phase with the catalyst structures 22 where the methanol preferentially reacts with the isobutene to form MTBE. This reaction is exotheric. The heat of the reaction is thus utilized to fractionate the reaction mixture. Unreacted $C_4$ and methanol are removed as overhead 25 and a high purity either product removed as bottom 26. Reflux condensers and reboilers are not shown but are conventional and adapted for the specific reaction as those of ordinary skill in the art will deem necessary.

The condensate from each tray 21 flows over weir 27 into downcomers 28 onto the next lower tray 21 (if any) onto the inlet seal pan 29 and hence over weir 30 where the liquid phase further contacts the catalyst in the containers. The trays are conventional to the extent that perforations, or other means are provided for vapor flow through the column with provision for placement of the catalyst structure thereon. It is also readily apparent that the catalyst structure need not extend over the entire tray, but may be in only a portion of the tray. This is a matter to be decided for each reaction and would consider economic factors, as well as the physical characteristics of tray, i.e., less catalyst structure would tend to allow the trays to operate more efficiently as distillation trays, and less efficiently as catalyst contact sites. In such an arrangement it can be contemplated longer catalyst beds would be required compared to the same reactor through puts and the like with larger numbers of catalyst structures on each tray.

The invention claimed is:

1. A contact catalyst structure comprising a plurality of porous closed containers, containing therein solid particulate catalyst and clip means, for holding and spacing said containers as a unit for disposition above a distillation tray of a distillation column, said clip means comprising at least one structure comprising a base member and a plurality of resilient pairs of members extending substantially perpendicular therefrom for grasping and holding said containers, one each between each of said pair of resilient members.

2. The contact catalyst structure according to claim 1 wherein said solid particulate material is in the range of 0.25 mm to 1 mm diameter.

3. A contact catalyst structure comprising a plurality of porous closed containers which are wire mesh containing therein solid particulate catalyst in the range of 0.25 to 1 mm diameter and clip means for holding and spacing said containers as a unit for disposition above a distillation tray of a distillation column.

4. A contact catalyst structure comprising a plurality of porous closed containers which are plastic mesh, containing therein solid particulate catalyst in the range of 0.25 to 1 mm diameter and clip means for holding and spacing said containers as a unit for disposition above a distillation tray of a distillation column.

5. The contact catalyst structure according to claim 2 wherein said container is fiber glass cloth.

6. The contact catalyst structure according to claim 1 wherein said solid particulate material is in the range of 0.25 mm to 1 mm diameter.

7. The contact catalyst structure according to claim 6 wherein said container is wire mesh.

8. The contact catalyst structure according to claim 6 wherein said container is plastic mesh.

9. The contact catalyst structure according to claim 6 wherein said container is fiber glass cloth.

* * * * *